Figure 4:
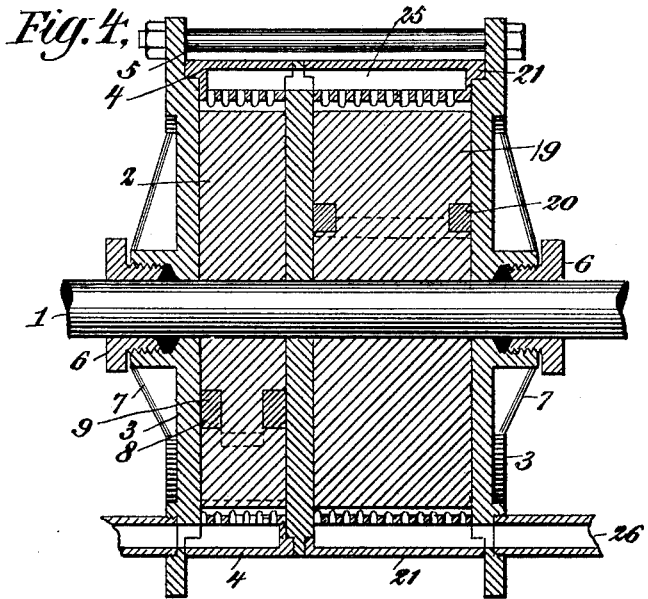

(No Model.) 4 Sheets—Sheet 1.
G. B. SHEPARD.
ROTARY MOTOR.
No. 586,733. Patented July 20, 1897.
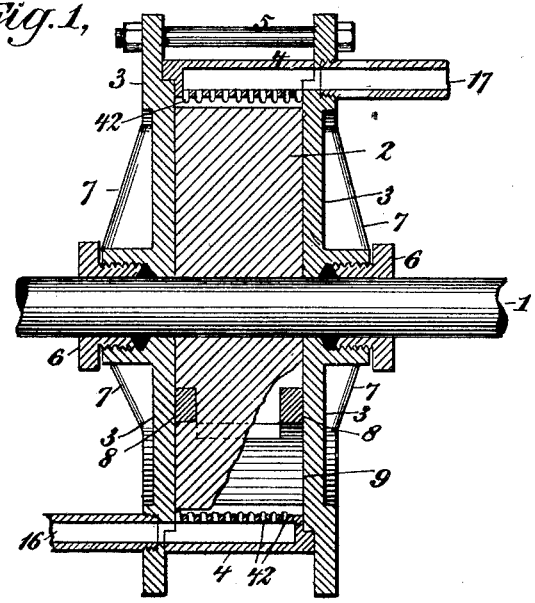
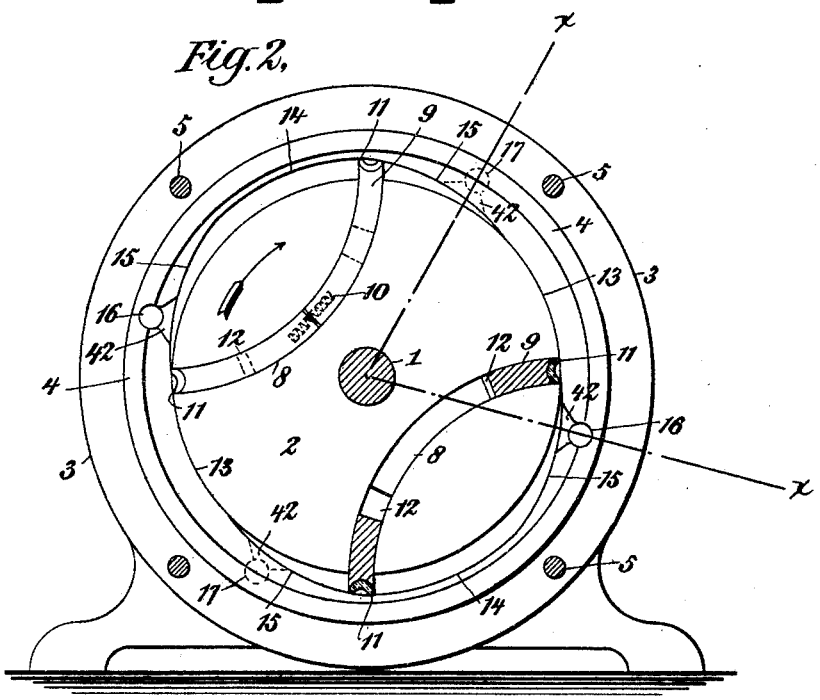
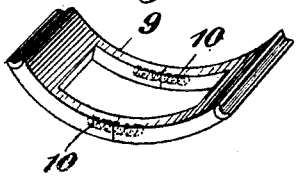
WITNESSES: INVENTOR
George B. Shepard
BY
Witter & Kenyon,
ATTORNEYS.

(No Model.) 4 Sheets—Sheet 2.

G. B. SHEPARD.
ROTARY MOTOR.

No. 586,733. Patented July 20, 1897.

WITNESSES:

INVENTOR
George B. Shepard
BY
Witter & Kenyon
ATTORNEYS.

(No Model.) 4 Sheets—Sheet 3.

G. B. SHEPARD.
ROTARY MOTOR.

No. 586,733. Patented July 20, 1897.

WITNESSES:
Edwin Segus
Sidney Mann

INVENTOR
George B. Shepard
BY
Witter & Kenyon,
ATTORNEYS.

(No Model.) 4 Sheets—Sheet 4.

G. B. SHEPARD.
ROTARY MOTOR.

No. 586,733. Patented July 20, 1897.

WITNESSES:

INVENTOR
George B. Shepard,
BY
Witter & Kenyon,
ATTORNEYS.

UNITED STATES PATENT OFFICE.

GEORGE BOHAN SHEPARD, OF OGDENSBURG, NEW YORK.

ROTARY MOTOR.

SPECIFICATION forming part of Letters Patent No. 586,733, dated July 20, 1897.

Application filed January 13, 1897. Serial No. 619,050. (No model.)

*To all whom it may concern:*

Be it known that I, GEORGE BOHAN SHEPARD, a citizen of the United States, residing at Ogdensburg, in the county of St. Lawrence and State of New York, have invented a new and useful Improvement in Rotary Motors, of which the following is a full, clear, and exact specification, reference being had to the accompanying drawings, which form a part hereof.

My invention relates to that class of rotary devices adapted to be used either as a motor by the force of any fluid under pressure or when rotated by outside force as a pump (both suction and force) for air, gas, water, or any fluid, or for a meter for gas, water, or any other fluid; and the objects of my invention are to provide a motor, or pump, or meter that can be cheaply and easily made and repaired, run at high speed without undue wear or vibration and readily reversed, and that will be positive in its action and economical in its operation and at the same time simple and compact in construction.

My invention consists, first, in the combination, in a rotary device, of two parts, one encircling the other, one of which is adapted to revolve with reference to the other, and one of which parts is provided with a cam-surface or raceway having two or more portions concentric with the axis of rotation, but at different distances therefrom, and inclined portions connecting the concentric portions, all these portions together forming a cam-surface upon which the bearing-surfaces at or near the ends of the gates bear and ride, and the other part having a surface in part or in whole concentric with the axis of rotation, so as to fit closely against the raised part of the cam-surface above described and thus form pockets between the two parts of the device, and a double-headed gate having bearing-surfaces at or near both ends, the gate being so constructed and arranged that the portions of the gate at or near both ends thereof—that is to say, the portions of the gate adjoining the bearing-surfaces, but on the other side thereof from the cam-surface—will successively constitute one of the walls of the working chamber and will be positively moved into operative position for that purpose by the action of one of the inclined portions of the cam-surface upon the bearing-surface at or near the other end of the gate, whereby both ends of the gate are successively brought into operation and made to form a part of the walls of the working chamber in which the pressure is exerted, which gives to the device the rotary motion.

My invention also consists in the combination, with the other parts above mentioned, of a plurality of double-headed gates such as above described, whereby the rotating part is balanced on its axis and is relieved from sidewise twist or strain.

My invention also consists in making all the portions of the cam-surface which are concentric with the axis of rotation, including both the raised concentric portions and the depressed concentric portions, of substantially equal arc and equidistant from one another, whereby the pockets or fluid-spaces are made more symmetrical and the operation of the device is more steady and uniform, and an extended fluid-joint is secured between the raised portion of the cam-surface and the other part of the device.

My invention also consists in making the inclined connecting portions of the cam-surface of a uniform curve—that is, a curve described with the same radius.

My invention also consists in arranging the gates so that they are equidistant from each other and in employing the same number of gates as there are raised concentric portions on the cam-surface.

My invention also consists in providing the part of the device which does not carry or support the cam-surface with interior slots—that is, slots which are on the interior of the device as distinguished from slots or openings that extend through the wall or casing to the exterior—the said interior slots being adapted to hold and guide the double-headed gates and to permit them to be reciprocated by the action of the cam-surface, whereby a self-contained device is secured which is simpler in construction and better in other respects than those rotary devices heretofore in use in which the gates were reciprocated through openings in the shell or casing of the engine provided with packings and were supported and operated by means on the exterior of the engine.

My invention also consists, broadly, in the combination of two parts, one encircling the other and one revolving with reference to the other, and one provided with a suitable cam-surface, of a double-headed curved gate having bearing-surfaces at or near both ends, the gate being so constructed and arranged as to bring both ends successively into operation in the manner above explained, whereby the friction upon the gate is reduced and the power of the device correspondingly increased.

My invention also consists in making the double-headed gate in two parts and connecting these parts by a suitable spring device.

My invention also consists in the combination, with some or all of the parts already mentioned, of a secondary drum and shell and gates similarly constructed and arranged, the inlet-port of the secondary part being connected in axial line with the outlet-port of the primary part, or substantially in this way, whereby the corresponding parts of the secondary device are advanced somewhat around the axis or shaft, and the combined action of the two parts of the device produces a steadier and more uniform motion and speed.

My invention also consists in certain other features of construction and combinations of parts hereinafter described and claimed.

My invention is specifically illustrated in the accompanying drawings, in which—

Figure 5:
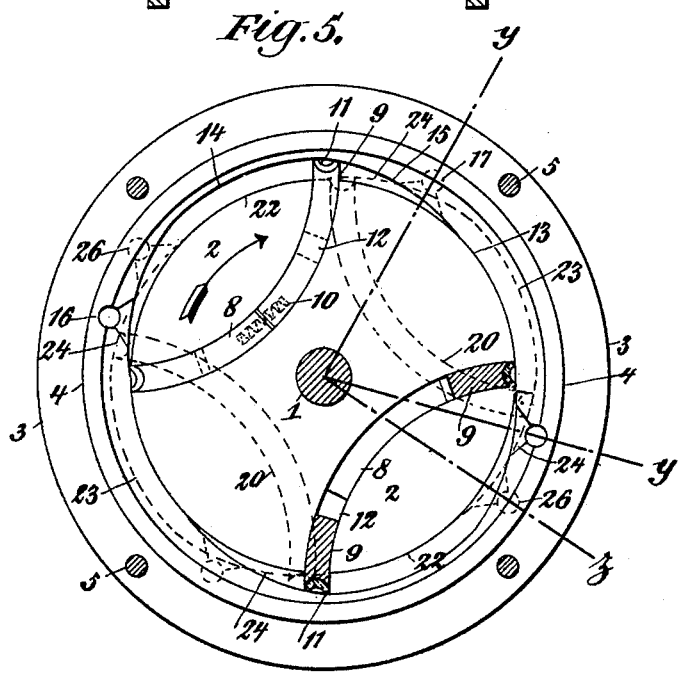
Figure 6:
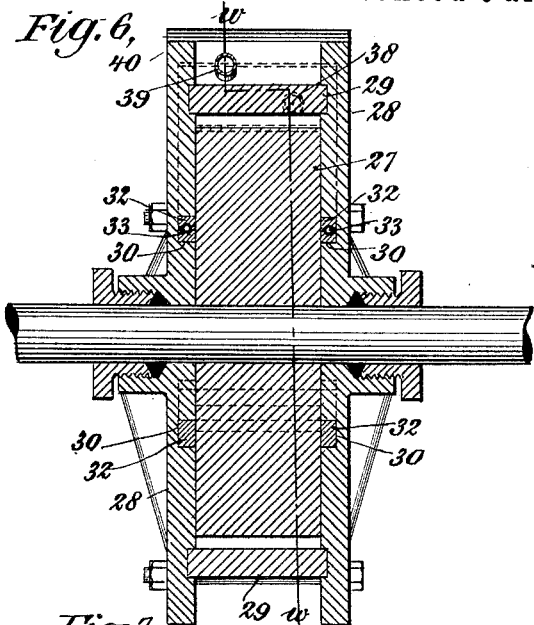
Figure 7:
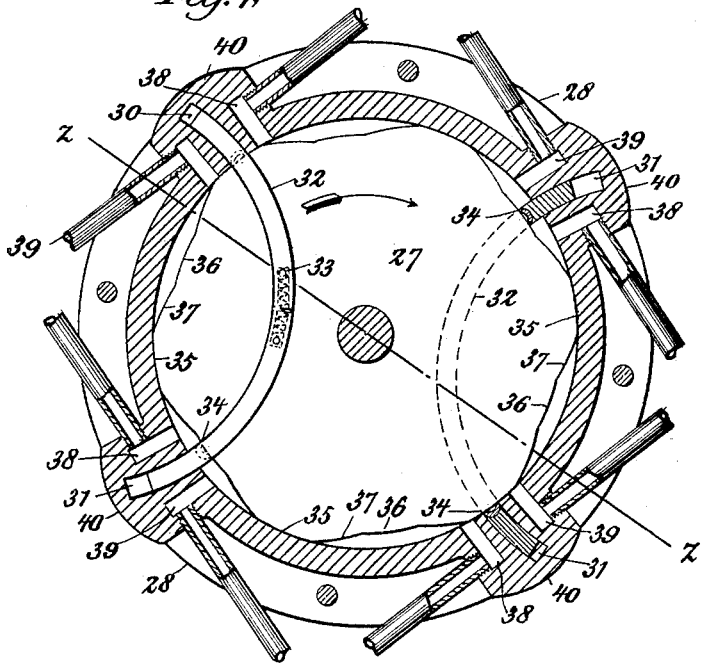
Figure 9:
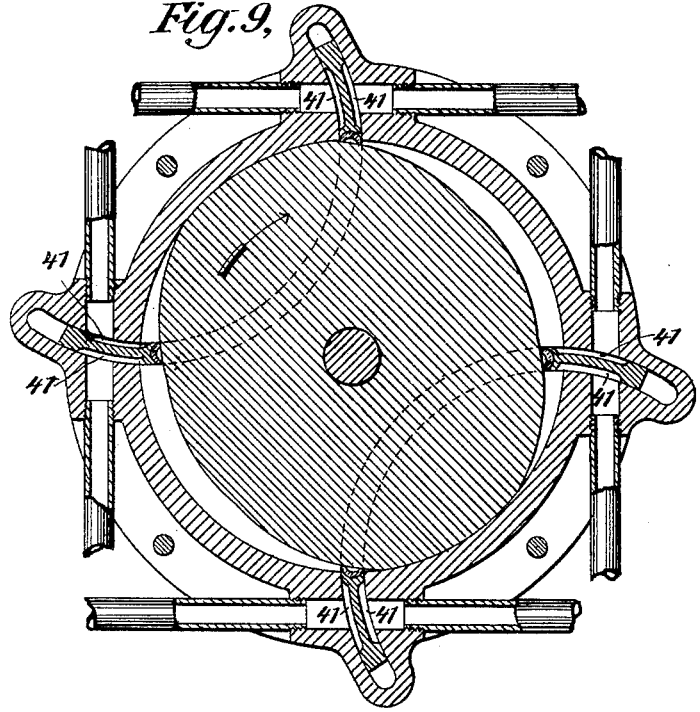
Figure 8:
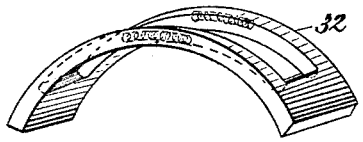
Figure 10:

Figure 1 is a sectional view on the line $xx$ of Fig. 2, looking from left to right. Fig. 2 is an end view with one of the face-plates removed and showing a section of the lower gate. Fig. 3 is a perspective view of one of the double-headed gates. Fig. 4 is a sectional view of a compound arrangement on the lines $yy$ and $yz$ of Fig. 5, looking from left to right, the primary being sectionalized on the line $yy$ of Fig. 5 and the secondary being sectionalized on the line $yz$ of Fig. 5, looking from left to right. Fig. 5 is an end view of Fig. 4 with one of the face-plates removed, showing the lower gate in section, the dotted lines showing the relative position of the compound. Fig. 6 is a sectional view of another form of my invention made on the line $zz$ of Fig. 7. Fig. 7 is a sectional view on the line $ww$ of Fig. 6, the left-hand gate and the drum being shown in full and the right-hand gate being shown in section. Fig. 8 is a perspective view of the form of gate shown in Figs. 6 and 7. Fig. 9 is a sectional view of a modification of my invention provided with cut-offs. Fig. 10 is a perspective view of the form of gate shown in Fig. 9.

Similar numbers indicate similar parts in the different figures.

Referring now to the simple form shown in Figs. 1, 2, and 3, 1 represents the shaft; 2, a drum or disk secured thereto so as to revolve therewith; 3 3, the face-plates, and 4 a ring provided with a cam-surface or raceway. The face-plates and the ring together surround the said revolving drum, forming an encircling shell or casing therefor. The said ring is located upon said face-plates by means of an annular rabbet formed on said face-plates, and the parts are held firmly in place by means of the through-bolts 5, which are carried through holes arranged in the rim of said face-plate at suitable distances apart and provided with the nuts shown at either end, by use of which the said face-plates can be held rigidly against the ends of said ring 4.

The face-plates 3 3 may be provided with a central boss having an internal thread, into which are screwed the shaft journal-bearings 6 6 in the usual manner, and they may also be provided with radial ribs 7 7, as shown, to strengthen them against outward thrust.

On each end of the drum 2 are cut two diametrically-opposed uniformly-curved channels, as shown at 8 in Figs. 1 and 2, those cut on one end of the drum being parallel with those on the other end thereof, and for a part of their course from each end the said channels are connected by an axial cross-channel 12, cut entirely through said drum from end to end. These channels and cross-channels together form slots for the purpose of seating within said drum double-headed gates 9, one of which is shown in Fig. 3. These slots hold and guide the gates as they are reciprocated back and forth. Each gate is cut away in the center to embrace the solid portion of the drum left between said side channels and cross-channels, and in the best form of my invention is divided in the middle, as shown in Fig. 3. Holes are bored into the end of each of the parts and the spiral springs 10 10, seated therein, to compensate for wear and to force the ends of said gates into any irregularities in the surface of the cam or raceway hereinafter described. It is apparent, however, that the gate may be made in one piece, and the part of the drum on the outer side of the gate may be temporarily detached from the body of said drum to enable the gate to be placed in position.

The gates may be provided at their bearing surfaces or ends with rocking shoe-pieces 11, fitted into grooves in the gates and adapted to turn or rock therein and to bear at all times against and to be in constant contact with the cam-surface or raceway on the ring 4, as shown in Fig. 2, and to form a substantially fluid-tight joint therewith. It is, however, apparent that the gates may be extended the requisite length to at all times thrust their ends to a bearing upon said cam-surface; but in that case all wear would come upon said ends and the gates would have to be more frequently renewed, while otherwise the wear comes upon the shoe-pieces, which are easily renewed by simply removing one of the face-plates hereinbefore described. The gates are formed to closely fit within the slots formed in the drum, as heretofore described, but with sufficient endwise play to enable either end to be retreated within said drum, but of sufficient width to closely fill the said slots and form a substantially fluid-tight joint therewith and with the attinging surface of the face-plate, and they are of sufficient length so that their outer ends shall at all times bear upon the cam-surface of the raceway-ring 4, as hereinafter described.

The cam-surface on the ring 4 consists of eight distinct portions. There are two raised portions 13 13, which are concentric with the axis of rotation and at such a distance therefrom that they at all times bear against the circumference of the drum 2 and form a steam or fluid tight joint therewith. They are diametrically opposite each other and are forty-five degrees in length—that is to say, the arc of each one is equal to the eighth part of its circle. There are two depressed portions 14 14, which are also concentric with the axis of rotation and diametrically opposite each other and of the same length of arc—that is to say, each of these portions is forty-five degrees in length or the eighth part of its circle. The portions 14 14 are at a greater distance from the axis of rotation than the portions 13, as a result of which pockets are formed between these portions 14 14 and the drum 2. The portions 13 13 are connected with the portions 14 14 by the inclined portions 15 15. These portions 15 are made with a uniformly-curved surface such as would be struck from a center the radius of which is the mean between the two radii from which the surfaces 13 13 and 14 14 are struck, respectively. They are of the same length as the concentric portions— that is, each inclined portion 15 extends forty-five degrees measured on a line concentric with the axis of rotation, occupying, therefore, one-eighth part of the circle of rotation. The ends of the gates or their bearing-surfaces are formed to fit at all points of their revolution and to bear closely against the cam-surface, so as to form a steam or fluid tight joint therewith. The drum 2 is made with a surface in part or in whole concentric with the axis of rotation. I prefer to make its entire surface concentric, as shown; but it is manifest that some portions of its surface might be cut away without preventing the operation of the device. It will be observed that this form of construction at all times maintains the same distance between points of said cam-surface ninety degrees distant from each other when measured on radial lines from the axis of said drum, so that as the said surface approaches said axis at one point its surface at a point ninety degrees distant therefrom correspondingly retreats from said axis. Therefore the distance between the said points along the line of the gates will always be the same, and consequently the ends of said gates will always bear against the cam-surface during their entire revolution with said drum. It is apparent that this method of construction forms a series of pockets in the encircling shell between the raised concentric portions 13 13, which pockets consist, first, of an expanding inclined curve 15, a concentric rest 14, and a contracting inclined curve 15, and that any desired number of such pockets may be formed in the said shell if the above-described relative proportions of raised concentric portion fall, rest, and rise of the cam-surface and the relative length of curved gate with said pockets be maintained, as above explained, so that both ends or bearing-surfaces of said gates shall at all times attinge upon the cam-surface. In the best form of my invention it is essential that such pockets shall be two or more in number and equidistant circumferentially of said drum, or otherwise when steam or other propulsive force is admitted into said pockets, as hereinafter described, the equilibrium of said drum would be destroyed and excessive friction against its rotation be caused, all of which I avoid by the construction already described.

For the purpose of supplying propulsive force to rotate said drum I provide inlet-ports 16 16 through said head about midway of the course of said expanding incline on said cam-surface and outlet-ports 17 17, similarly situated on the incline at the other end of the pocket, and cut channels 42 from said ports in both directions, as shown, to prevent a vacuum or cushion being formed between the raised portions 13 and the ends of said gates as they revolve, as herein described. While it is desirable to have the outlet-ports somewhat larger than the inlet-ports, they may be constructed of the same size, as herein illustrated, and used interchangeably for the purpose of reversing the direction of rotation of said drum, or instead of being led through the head or face plate, as shown, said ports or either of them may be cut through the ring 4.

In the best form of my invention a series of channels extending entirely across the ring are employed to connect the ports with the interior of the shell, and the channels on one side of the device are alternated or staggered with those on the opposite side of the device, so that the intervening walls between the channels on one side will be exactly opposite the channels on the other side. The object of this is to prevent the uneven wear upon the face of the drum and shoe-pieces, which would result from having the channels opposite one another and the intervening walls opposite one another.

In Figs. 4 and 5 my invention is shown as applied to a compound rotary engine or device. In this case there is a secondary drum 19 hung on the same shaft with similar gates 20 20, and a secondary shell or ring 21, provided with a cam-surface having similar raised concentric portions 22, depressed concentric portions 23, and inclined connecting portions 24 and secondary inlet-ports 25 25 and outlet-ports 26 26. The secondary shell and drum are advanced in position around the axis of rotation relatively to the primary shell and drum, so that the inlet-ports of the secondary shell are connected in axial line with the outlet-ports of the primary shell, the same relative positions of shell, drum, gates, and ports being preserved in the secondary device as in the primary device.

In Fig. 5 the cam-surface, the gates, and the ports of the secondary part are indicated in dotted lines, the full lines showing the corresponding devices of the primary. The relative positions of the corresponding devices in the two parts are thus clearly shown. It will be readily seen that this last form of device forms what is commonly termed a "dry" compound engine when steam is used. The relative proportions of the primary and secondary pockets can be varied, as desired, to obtain the best results, and additional drums and coincident mechanism may be added without destroying the principle of its operation.

Supports in any form may be attached to the shell or casing to hold it in place, as represented in Fig. 2, or the casing may be provided with a pulley-surface and the inlet and outlet ports led into said pockets through a hollow shaft and openings in said drum on each side of said gate ends, as heretofore done in rotary engines having radially-vibrating gates, and the shaft and drum held rigidly in place, when said casing would rotate instead of said drum and shaft.

In operation the parts being assembled as hereinbefore described and steam or other plenum force being admitted through the inlet-ports 16 and being confined between the opposite surfaces of the face-plates it fills said pockets until at one end thereof it encounters the raised concentric portion 13 of the cam-surface and can go no farther in that direction, and in the opposite direction encounters the end of the gate 9, with its projected shoe bearing tightly against the cam-surface and filling the space between the walls of said pocket and the circumference of the drum and constituting one of the walls of the said pocket or working chamber, so that it can go no farther in that direction except by forcing forward the end of said gate toward the outlet-port in said pocket, which it consequently does; but before the said gate reaches said outlet-port the other end of said gate is interposed between said inlet and outlet ports by the action of the rotation of said drum, in which said gates are seated, and by the positive action of the inclined surface of the farther side of said pocket bearing against the advance end of said gate, as heretofore shown. The end of the second gate is then interposed in similar manner and so on as long as the supply of steam or other plenum force is continued.

It will be seen that the double-headed gate is so arranged that the portions of the gate at or near both ends successively constitute one of the walls of the working pocket or chamber and are positively moved into operative position for that purpose by the action of the inclined portion of the cam-surface upon the bearing-surface at or near the other end of the gate. In the best form of my invention, such as is shown in Figs. 1 and 2, the end of the gate is not only moved into such operative position by the action of the cam-surface on the other end of the gate, but it is held positively in that position in the same way during all the time it is traveling along the depressed concentric portion 14. It would be possible, however, to cut away some part of the raised concentric portion 13—for example, at the middle part thereof—without destroying the operation of the device, but this form would be inferior.

It is apparent that a valve of ordinary construction may be interposed in the supply-pipes and operated by an eccentric attached to the shaft in the usual manner to cut off the said supply of steam at any desired point, so as to use the same expansively, as is now done in steam-engines of different forms, or if it is desired to operate my improved device by vacuum that can be done by opening the supply-pipe to the air and attaching the exhaust-pipe to exhausting apparatus, when the operation of the device would be similar to that above described, or if the supply-pipe be attached to any fluid-supply and the outlet-pipe attached to a reservoir and the said shaft and drums rotated by outside force it is apparent that my said motor will act as a lifting or force pump for any fluid desired.

My invention may also be used as a meter for measuring gas or any other fluid by providing it with suitable registering devices to record the number of revolutions, the size of the pockets being known and it being therefore possible to accurately estimate the amount of gas or fluid passing through it if the number of revolutions is known.

In Figs. 6 to 8 a modification of my invention is shown in which the cam-surface is formed upon the drum and the gates are supported in the shell or casing. 27 is the drum; 28 28, the face-plates; 29, the ring; 30 30, the channels in the face-plates, in which the gates slide; 31 31, the cross-channels in which the ends of the gates are held and slide; 32 32, the gates, provided with springs 33 to connect their parts together; 34, the shoe-pieces; 35 35, the raised concentric portions of the cam-surface on the drum; 36 36, the depressed concentric portions; 37 37, the inclined connecting portions; 38 38, the inlet-ports, and 39 39 the outlet-ports. The cam-surface is provided with six raised concentric portions adapted to bear closely against the concentric surface on the shell, so as to make a substantially tight steam or fluid joint therewith, instead of having only two such portions, as in the form shown in Figs. 1 and 2. As a result of this each gate is reciprocated back and forth six times for each revolution of the device. As there are only four inlet-ports, the pockets will at times be simply dead spaces full of steam or fluid, but not operative in the production of power. The gates instead of having bearing-surfaces at their extreme ends are formed with bearing-surfaces or shoes near their ends and at the ends of their middle slots or openings, which are adapted to receive and inclose the drum, as clearly shown in Fig. 8. These ends are preferably grooved, as already explained, to receive and hold rocking shoes, as shown, and these bearing-surfaces of the gates bear against the cam-surface on the drum. 40 40 are projecting parts on the exterior of the shell, in which are contained the cross-channels 31, forming a part of the interior slots in which the gates reciprocate, and also the inlet and outlet ports. The cross-channels extend entirely across the inner face of the ring and join the side channels 30, which are formed on the interior of the face-plates. The spring 33 is a tension-spring secured at its ends to the two parts of the gate and operating to draw the parts of the gate together, and thereby to keep the bearing-surfaces in contact with the cam-surface. The several concentric portions of the cam-surface, as well as the inclined connecting portions, are made of equal arc, and the inclined portions are uniformly curved, as already explained. The operation of this form of my invention is substantially the same as that of the form shown in Figs. 1 and 2. After a raised concentric portion of the cam-surface has passed an inlet-port the steam or other fluid enters the pocket between the said concentric portion and the gate and forces them apart, which causes rotation of the movable part. Either the drum or the shell can be constructed so as to revolve, or both might revolve in opposite directions.

In Fig. 9 a form is shown similar to that of Fig. 7 except that the drum has but two raised concentric portions instead of six, and the ports are provided with cut-offs. These cut-offs are formed by making pockets 41 in the faces of the ends of the gates, as clearly shown in Figs. 9 and 10. The pocket on one side is connected with the inlet-port, and the pocket on the other side is connected with the outlet-port. These pockets are so arranged that the retreating of the gate within the case by the advancement of the inclined portion of the cam cuts off both the inlet and the outlet ports from communication with the working chamber before the end of the gate is entirely retreated, so that the inlet and outlet ports will not be in communication simultaneously with the same chamber.

In the best form of my invention the rotary device above described is constructed in all its parts of the same material throughout, such as cast-iron or brass, and consequently when steam or fluid of varying temperature is used all parts of the machine will expand in like degree, thereby insuring uniform fit of the working parts relatively to each other, which in a rapidly-moving machine is a very valuable quality.

I wish to call attention to the fact that my rotary device above described takes its propelling power simultaneously at opposing equidistant points of its circumference, so that there is caused no sidewise or torsional strain or twist upon the shaft. I also wish to call attention to the further fact that by the use of my invention, as shown, when the supply of propelling fluid is not cut off to allow expansion thereof the rotative power exerted thereby is uniform at all points of rotation except for the short distance between the port and the nearest raised portion of the cam-surface and that the effect of this weaker point can be avoided by attaching two of my motors of the same capacity to the same shaft, but relatively at one-quarter revolution thereon where two gates are employed, so that the weak point of one will time with the middle of the strongest period of the other, and that therefore a fly-wheel as commonly employed on reciprocating engines can be entirely dispensed with and my rotary device be attached directly to the shaft of a dynamo without causing a pulsatory vibration in the light obtained therefrom, as is usually the case when so coupled with fast-running engines.

If my device is used as a steam-motor, the exhaust can be condensed, if desired, or a vacuum-pump can be used.

It will be apparent that many of the details of my rotary device can be varied or altered and that certain features or elements can be used independently of other features or elements or in other combinations.

It is manifest that the relative lengths of the concentric portions and the inclined portions might be somewhat varied if a solid gate were used, according to the width of the gates, without substantially changing the operation from what it would be if the said portions were made of the same arc and rocking shoes were used at the ends of the gates.

The concentric portions must be of substantially equal arc, so that both ends of the gates will be kept in contact with the cam-surface.

Both the shell and drum may revolve, or one may be revolved and the other may be stationary.

The number of gates and the number of concentric portions on the cam may be varied according to circumstances.

Some of the advantages secured by my invention are simplicity of construction, certainty and uniformity of operation, positive action of the reciprocating gates, protection of the different parts from wear and injury resulting, in part, from the fact that the operating parts of the engine are all contained within the shell, an accurate balancing of the device relieving it from sidewise or torsional strain, reduction of friction, and economy in the production of power.

What I claim as new, and desire to secure by Letters Patent, is—

1. In a rotary device, the combination of two parts one encircling the other, one of which is adapted to revolve with reference to the other, one being provided with a cam-surface having substantially equal portions concentric with the axis of rotation but at different distances therefrom, and inclined portions connecting said concentric portions, and the other having a surface in part or in whole concentric with the axis of rotation, and a double-headed gate having bearing-surfaces at or near both ends, so arranged that the portions of the gate at or near both ends successively constitute one of the walls of the working chamber and are positively moved to operative position for that purpose by the action of the inclined portion of the cam-surface upon the bearing-surface of the other end of the gate, and suitable inlet and outlet ports, substantially as set forth.

2. In a rotary device, the combination of two parts one encircling the other, one adapted to revolve with reference to the other, one being provided with a cam-surface having substantially equal portions concentric with the axis of rotation but at different distances therefrom, and inclined portions connecting said concentric portions, and the other having a surface in part or in whole concentric with the axis of rotation between which surfaces pockets are formed, and double-headed gates having bearing-surfaces at or near both ends, so arranged that the portions of each gate at or near both ends successively constitute one of the walls of the working chamber and are positively moved to operative position for that purpose by the action of the inclined portion of the cam-surface upon the bearing-surface of the other end of the gate and suitable inlet and outlet ports, substantially as set forth.

3. In a rotary device, the combination of two parts one encircling the other, one adapted to revolve with reference to the other, one being provided with a cam-surface having raised portions concentric with the axis of rotation and depressed portions concentric with said axis, said concentric portions being of substantially equal arc and equidistant from one another, and inclined portions connecting the concentric portions, and the other having a surface in part or in whole concentric with the axis of rotation and double-headed gates having bearing-surfaces at or near both ends, so arranged that the portions of each gate at or near both ends successively constitute one of the walls of the working chamber and are positively moved to operative position for that purpose by the action of the inclined portion of the cam-surface upon the bearing-surface of the other end of the gate and suitable inlet and outlet ports, substantially as set forth.

4. In a rotary device, the combination of two parts one encircling the other, one adapted to revolve with reference to the other, one being provided with a cam-surface having raised portions concentric with the axis of rotation and depressed portions concentric with said axis, said concentric portions being of substantially equal arc and equidistant from one another, and uniformly-curved inclined portions connecting the concentric portions, and the other having a surface concentric in part or in whole with the axis of rotation and double-headed gates having bearing-surfaces at or near both ends, so arranged that the portions of each gate at or near both ends successively constitute one of the walls of the working chamber and are positively moved to operative position for that purpose by the action of the inclined portion of the cam-surface upon the bearing-surface of the other end of the gate, and suitable inlet and outlet ports, substantially as set forth.

5. In a rotary device, the combination of two parts one encircling the other, one adapted to revolve with reference to the other, one being provided with a cam-surface having raised portions concentric with the axis of rotation, and depressed portions concentric with said axis, the concentric portions being substantially equal, and inclined portions connecting the concentric portions, and the other having a surface in part or in whole concentric with the axis of rotation and double-headed gates equidistant from each other and having bearing-surfaces at or near both ends, so arranged that the portions of each gate at or near both ends successively constitute one of the walls of the working chamber and are positively moved to operative position for that purpose by the action of the inclined portion of the cam-surface upon the bearing-surface of the other end of the gate, and suitable inlet and outlet ports, substantially as set forth.

6. In a rotary device, the combination of two parts one encircling the other, one adapted to revolve with reference to the other, one being provided with a cam-surface having raised portions concentric with the axis of rotation and depressed portions concentric with said axis, the concentric portions being substantially equal, and inclined portions connecting the concentric portions, and the other having a surface in part or in whole concentric with the axis of rotation, and double-headed gates equidistant from each other and equal in number to the number of raised concentric portions on the cam-surface and having bearing-surfaces at or near both ends, so arranged that the portions of each gate at or near both ends successively constitute one of the walls of the working chamber and are positively moved to operative position for that purpose by the action of the inclined portion of the cam-surface upon the bearing-surface of the other end of the gate, and suitable inlet and outlet ports, substantially as set forth.

7. In a rotary device the combination of two parts one encircling the other, one adapted to revolve with reference to the other, one being provided with a cam-surface having substantially equal portions concentric with the axis of rotation and inclined portions connecting said concentric portions, and the other having a surface in part or in whole concentric with the axis of rotation and provided with one or more interior slots to hold and guide the gate or gates, and one or more double-headed gates sliding in said slots and having bearing-surfaces at or near both ends so arranged that the portions of each gate at or near both ends successively constitute one of the walls of the working chamber and are positively moved to operative position for that purpose by the action of the inclined portion of the cam-surface upon the bearing-surface of the other end of the gate, and suitable inlet and outlet ports, substantially as set forth.

8. In a rotary device, the combination of a drum and an encircling shell, one adapted to revolve with reference to the other, the shell being provided with an interior cam-surface having raised portions concentric with the axis of rotation and depressed portions concentric with said axis, and inclined portions connecting said concentric portions, and the drum having a surface in part or in whole concentric with the axis of rotation and provided with uniformly-curved slots to hold and guide the gates, and double-headed uniformly-curved gates sliding in said slots and having bearing-surfaces at or near both ends adapted to be in constant contact with the cam-surface, and suitable inlet and outlet ports, substantially as set forth.

9. In a rotary device, the combination of a drum and an encircling shell, one adapted to revolve with reference to the other, the shell being provided with an interior cam-surface having raised portions concentric with the axis of rotation and depressed portions concentric with said axis, and inclined portions connecting said concentric portions, and the drum having a surface in part or in whole concentric with the axis of rotation and provided with uniformly-curved slots to hold and guide the gates, and double-headed uniformly-curved gates sliding in said slots and having bearing-surfaces at or near both ends adapted to be in constant contact with the cam-surface, the said gates being equidistant from each other, and suitable inlet and outlet ports, substantially as set forth.

10. In a rotary device, the combination of a drum and an encircling shell, one adapted to revolve with reference to the other, the shell being provided with an interior cam-surface having raised portions concentric with the axis of rotation and depressed portions concentric with said axis, said concentric portions being of substantially equal arc and equidistant from one another, and inclined portions connecting said concentric portions, and the drum having a surface in part or in whole concentric with the axis of rotation and provided with uniformly-curved slots to hold and guide the gates, and double-headed uniformly-curved gates sliding in said slots and having bearing-surfaces at or near both ends adapted to be in constant contact with the cam-surface, and suitable inlet and outlet ports, substantially as set forth.

11. In a rotary device, the combination of a drum and an encircling shell, one adapted to revolve with reference to the other, the shell being provided with an interior cam-surface having raised portions concentric with the axis of rotation and depressed portions concentric with said axis, said concentric portions being of substantially equal arc and equidistant from one another, and inclined portions connecting said concentric portions, and the drum having a surface in part or in whole concentric with the axis of rotation and provided with uniformly-curved slots to hold and guide the gates, and double-headed uniformly-curved gates sliding in said slots and having bearing-surfaces at or near both ends adapted to be in constant contact with the cam-surface, the said gates being equidistant from each other, and suitable inlet and outlet ports, substantially as set forth.

12. In a rotary device, the combination of a drum and an encircling shell, one adapted to revolve with reference to the other, the shell being provided with an interior cam-surface having raised portions concentric with the axis of rotation and depressed portions concentric with said axis, and inclined portions connecting the concentric portions, the concentric portions and the inclined portions being all of substantially equal arc, and the drum having a surface in part or in whole concentric with the axis of rotation, and provided with uniformly-curved slots to hold and guide the gates, and double-headed uniformly-curved gates sliding in said slots and having bearing-surfaces at or near both ends adapted to be in constant contact with the cam-surface, and suitable inlet and outlet ports, substantially as set forth.

13. In a rotary device, the combination of a drum and an encircling shell, one adapted to revolve with reference to the other, the shell being provided with an interior cam-surface having raised portions concentric with the axis of rotation and depressed portions concentric with said axis, and uniformly-curved inclined portions connecting the concentric portions, the concentric portions and the inclined portions being all of substantially equal arc, and the drum having a surface in part or in whole concentric with the axis of rotation, and provided with uniformly-curved slots to hold and guide the gates and double-headed uniformly-curved gates sliding in said slots and having bearing-surfaces at or near both ends adapted to be in constant contact with the cam-surface, and suitable inlet and outlet ports, substantially as set forth.

14. In a rotary device, the combination of a drum and an encircling shell, one adapted to revolve with reference to the other, the shell being provided with an interior cam-surface having raised portions concentric with the axis of rotation and depressed portions concentric with the said axis, and uniformly-curved inclined portions connecting the concentric portions, the concentric portions and the inclined portions being all of substantially equal arc, and the drum having a surface in part or in whole concentric with the axis of rotation, and provided with uniformly-curved slots to hold and guide the gates, and double-headed uniformly-curved gates sliding in said slots and having bearing-surfaces at or near both ends adapted to be in constant contact with the cam-surface, the said gates being equidistant from each other, and suitable inlet and outlet ports, substantially as set forth.

15. In a rotary device, the combination of a drum and an encircling shell, one adapted to revolve with reference to the other, the shell being provided with an interior cam-surface having raised portions concentric with the axis of rotation and depressed portions concentric with said axis, and inclined portions connecting the concentric portions, the concentric portions and the inclined portions being all of substantially equal arc, and the drum having a surface in part or in whole concentric with the axis of rotation, and provided with uniformly-curved slots to hold and guide the gates, and double-headed uniformly-curved gates sliding in said slots and having bearing-surfaces at or near both ends adapted to be in constant contact with the cam-surface, the said gates being equidistant from each other and there being as many gates as there are raised concentric portions on the cam-surface, and suitable inlet and outlet ports, substantially as set forth.

16. In a rotary device, the combination of two parts one encircling the other, one adapted to revolve with reference to the other, one being provided with a suitable cam-surface and a double-headed curved gate having bearing-surfaces at or near both ends, so arranged that the portions of the gate at or near both ends successively constitute one of the walls of the working chamber and are positively moved to operative position for that purpose by the action of the inclined portion of the cam-surface upon the bearing-surface of the other end of the gate, and suitable inlet and outlet ports, substantially as set forth.

17. In a rotary device, the combination of two parts one encircling the other, one adapted to revolve with reference to the other, one being provided with a suitable cam-surface and the other having a surface concentric in part or in whole with the axis of rotation, and a double-headed curved gate having bearing-surfaces at or near both ends adapted to be in constant contact with different parts of the cam-surface and suitable inlet and outlet ports, substantially as set forth.

18. In a rotary device, the combination of a drum and an encircling shell, one adapted to revolve with reference to the other, one being provided with a suitable cam-surface and the other having a surface in part or in whole concentric with the axis of rotation and provided with interior uniformly-curved slots to hold and guide the gates, and double-headed uniformly-curved gates sliding in said slots and having bearing-surfaces at or near both ends adapted to be in constant contact with different parts of the cam-surface, substantially as set forth.

19. In a rotary device, the combination of the drum 2 having a surface concentric with the axis of rotation, the shell 3, 3, 4, having a cam-surface as described, the curved gates 9 adapted to bear constantly at both ends against the cam-surface, the inlet-ports 16, 16, and the outlet-ports 17, 17, substantially as set forth.

20. In a rotary device, the combination of the drum 2 having a surface concentric with the axis of rotation, the shell 3, 3, 4, having a cam-surface as described, the curved gates 9 made in two parts, the springs 10, 10, connecting said parts, the gates being adapted to bear constantly at both ends against the cam-surface, the inlet-ports 16, 16, and the outlet-ports 17, 17, substantially as set forth.

21. In a compound rotary device, the combination of a primary consisting of two parts one encircling the other, one adapted to revolve with reference to the other, one being provided with a cam-surface having portions concentric with the axis of rotation but at different distances therefrom, and inclined portions connecting said concentric portions, and the other having a surface in part or in whole concentric with the axis of rotation between which surfaces pockets are formed, and double-headed curved gates having bearing-surfaces at or near both ends, so arranged that the portions of each gate at or near both ends successively constitute one of the walls of the working chamber and are positively moved to operative position for that purpose by the action of the inclined portion of the cam-surface upon the bearing-surface of the other end of the gate, and suitable inlet and outlet ports, and a secondary consisting of similar parts similarly constructed and arranged, the inlet-port of the secondary being connected in axial line with the outlet-port of the primary, substantially as set forth.

In testimony whereof I have signed my name to this specification in the presence of two subscribing witnesses.

GEORGE BOHAN SHEPARD.

Witnesses:
ROBERT E. WATERMAN,
CHAS. G. IDLER.